United States Patent [19]

Stone, Jr.

[11] Patent Number: 4,713,253
[45] Date of Patent: Dec. 15, 1987

[54] FLOAT ACTIVATED SIPHON FOR AUTOMATIC DRIP COFFEE MAKER

[75] Inventor: Wayne B. Stone, Jr., Bethesda, Md.

[73] Assignee: Wood Manufacturing, Flippin, Ark.

[21] Appl. No.: 899,725

[22] Filed: Aug. 25, 1986

Related U.S. Application Data

[63] Continuation-in-part of Ser. No. 734,210, May 15, 1985, Pat. No. 4,622,230.

[51] Int. Cl.⁴ .......................... A47J 31/00; A23F 5/00
[52] U.S. Cl. ...................................... 426/433; 99/299; 99/305
[58] Field of Search ................. 99/300, 301, 295, 304, 99/305, 306, 279, 307, 280, 299; 426/433

[56] References Cited

U.S. PATENT DOCUMENTS

| | | | |
|---|---|---|---|
| 2,663,248 | 12/1953 | Johnson | 99/300 |
| 2,786,408 | 3/1957 | Herrera | 99/283 |
| 3,320,073 | 5/1967 | Bixby | 99/71 |
| 3,336,856 | 8/1967 | Martin | 99/288 |
| 3,423,209 | 1/1969 | Weber | 426/433 |
| 3,589,271 | 6/1971 | Tarrant | 99/280 |
| 3,740,231 | 6/1973 | Drwal | 99/71 |
| 3,793,934 | 2/1974 | Martin | 99/304 |
| 4,094,233 | 6/1978 | Martin | 99/305 |

Primary Examiner—Robert W. Jenkins
Attorney, Agent, or Firm—Banner, Birch, McKie & Beckett

[57] ABSTRACT

A siphon of preheated water to a coffee filter basket is initiated by depression of the same float of the float valve assembly that controls the incoming plumb line to an automatic drip coffee maker.

8 Claims, 7 Drawing Figures

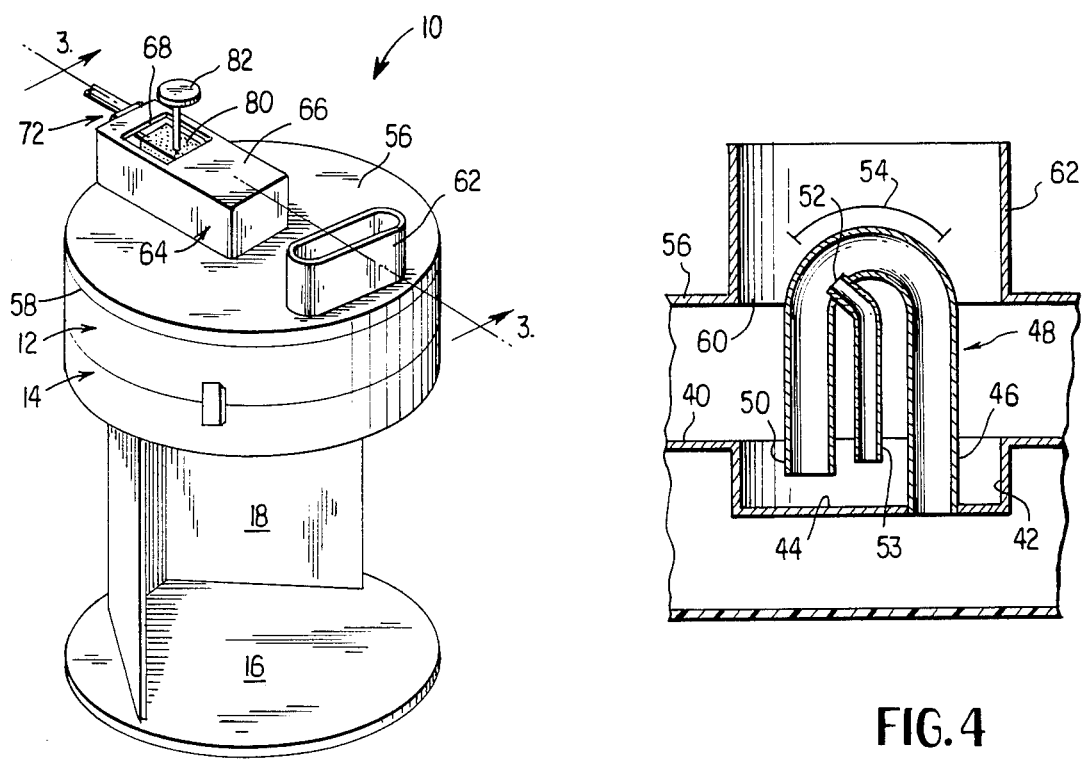
FIG. 1
FIG. 4
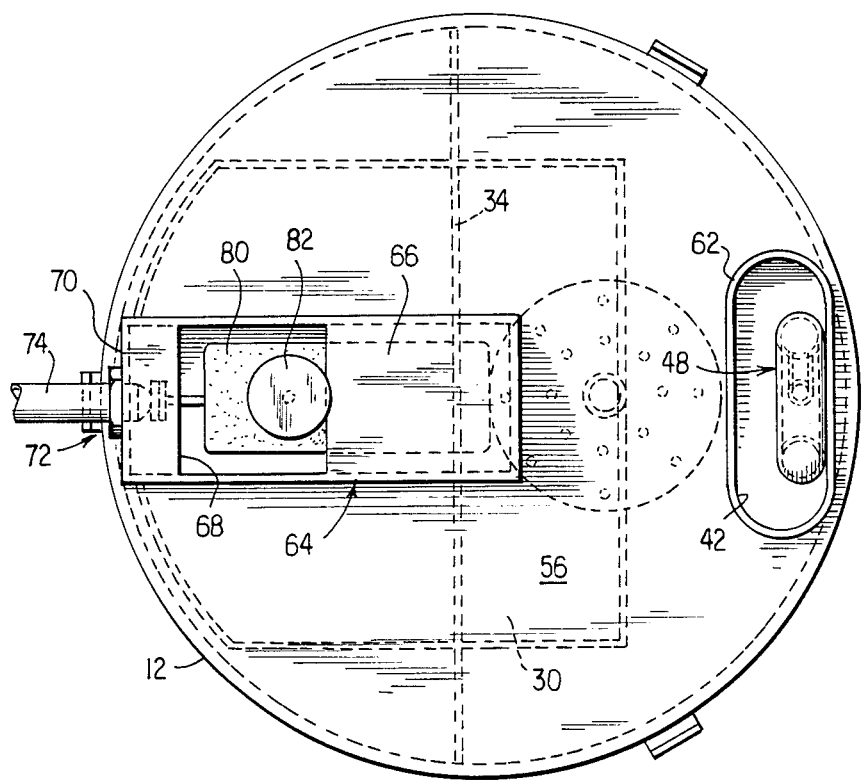
FIG. 2

U.S. Patent    Dec. 15, 1987    Sheet 3 of 3    4,713,253

FLOAT ACTIVATED SIPHON FOR AUTOMATIC DRIP COFFEE MAKER

CROSS REFERENCE TO RELATED APPLICATION

The present application is a continuation-in-part of application Ser. No. 734,210, filed May 15, 1985, now U.S. Pat. No. 4,622,230.

BACKGROUND OF THE INVENTION

The purpose of the present invention is to adapt the siphon flow and cut-off feature of preheated water to a coffee filter basket described in the parent application for "plumbed in" operation as opposed to the manual "pour over" operation described therein.

In the parent application, siphon flow is initiated by an inpour of cold water to an empty, bouyant tank floating on a body of preheated water to sink the same and thus raise the preheated water level to thereby submerge a siphon bight and commence the siphon flow that is metered to the coffee grounds.

SUMMARY OF THE INVENTION

In the present invention, the siphon flow is initiated by manual submergence of a float which raises the preheated water level and, simultaneously, admits cold water inflow (at a slow flow rate) to the preheat tank to replace the siphoned, preheated water. As the preheat tank is refilled, the rising float closes a cut-off valve to halt incoming water flow at a level just below the siphon bight so that, upon subsequent depression of the float, the newly admitted preheated water will be siphoned to the coffee filter basket.

DESCRIPTION OF THE DRAWINGS

FIG. 1 is a perspective view of the coffee maker of the present invention;

FIG. 2 is a top plan view thereof;

FIG. 4 is a longitudinal section illustrating the siphon and siphon cut-off;

DESCRIPTION OF THE PREFERRED EMBODIMENT

In FIG. 1 is illustrated a coffee maker 10 having a water holding tank 12 removably supported above a transfer tank assembly 14 which is supported in spaced overlying relation to a coffee pot support surface 16 adapted to incorporate a "keep warm" heater (not shown) via an integral support column 18.

Figure 3:
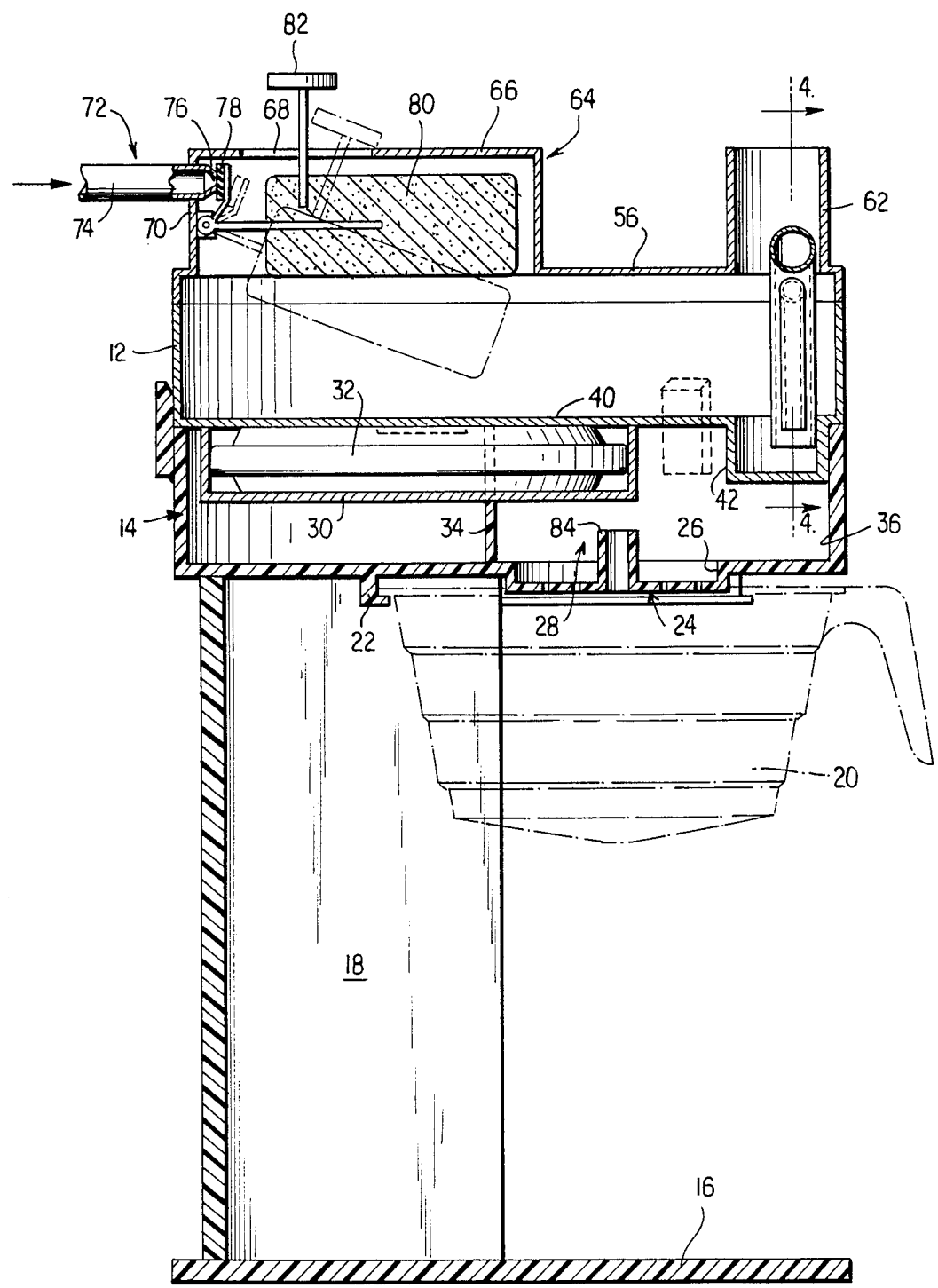
FIG. 3 is a longitudinal section taken along line 3—3 of FIG. 1.

A filter basket 20 (FIG. 3) is adapted to be supported via support tracks 22 beneath a spray head 24 comprising a perforated recessed portion 26 in the base of transfer tank assembly 14. The transfer tank per se (i.e., the water holding and transfer portion of the transfer tank assembly), is indicated by reference character 28 and partially underlies a heater element compartment 30 in which is supported a thermostatically controlled heater element 32 adapted to heat and maintain water in holding tank 12 at a desired, predetermined temperature. The electrical connections and controls for heater 32 have been omitted from the drawings; however, a detailed description of the thermostatically controlled heater (known as an EGO Fischer) and the electrical connections therefor are fully detailed in applicant's abandoned application Ser. No. 650,599, filed Sept. 14, 1984.

Transfer tank 28 is delimited by vertical walls 34 and peripheral wall 36 comprising approximately 180 degrees of the surrounding transfer tank assembly wall. Compartment 30 in transfer tank assembly 14 is watertight with respect to transfer tank 28 and accomodates the wiring connections to heater 32.

The base 40 of holding tank 12 is formed with a well 42 through the base 44 of which the longer leg 46 of a U-shaped siphon tube 48 extends (see FIG. 4). The shorter, inlet leg 50 terminates below the level of base 40 and above the floor of the well. The upper end of a siphon breaker tube 52 is in open communication with siphon tube 48 adjacent the bight 54 thereof and the lower end 53 is below the level of base 40 but above the inlet end of leg 50.

The specific siphon and siphon breaker combination shown in FIG. 4 is an important aspect of the invention insofar as consistency of long term operation is concerned. Prior art coffee makers that employed a siphon have been plagued by the inconsistency of "cut-off", i.e. a definite, clean cut-off with no leakage after cut-off. For example, if the siphon tube 48 of FIG. 4 be used without the cut-off, or siphon breaker, tube 52 to siphon water from tank 12; as the lowering water level reaches the open, inlet end 50, the rapid siphon flow out of the outlet leg 46 ceases but both legs remain partially filled with water. The shorter leg is just in contact with the lowered water level while the longer leg still contains a column of water with an air bubble adjacent the bight and temporarily trapped there until gravity ultimately overcomes the partial vacuum created in the bight. In accordance with the principles of the present invention additional water is quickly added to holding tank 12, therefore the siphon could be restarted upon the new water addition if the siphon cut-off is not such as to completely void the siphon tube of water immediately upon the water level in tank 12 reaching the lower end of siphon inlet leg 50.

The presence of the siphon breaker tube 52 in combination with a siphon assembly mounting in well 42 produces an immediate voiding of all water in the siphon. The explanation is as follows:

Once a siphon is started in siphon tube 48 (as in FIG. 6), the water level in tank 12 drops rapidly due to the large diameter of the siphon tube. Once the descending water level enters well 42 the rate at which the level lowers is extremely fast due to the small volume of the well so that the lowering water level quickly recedes well below the lower end 53 of the siphon breaker tube. When the receding water level then reaches the inlet end 50 of the siphon, the bubble that tends to remain in the bight of the siphon is vented via the siphon breaker 52 and both siphon legs 50 and 46 drain instantly for an instantaneous cut-off.

Water holding tank 12 has top wall 56 that is watertight with respect to tank 12 at the juncture 58 thereof as by any conventional means such as by soldering for a permanent assembly or the use of clamps and a sealing ring for a removable assembly. The upper end of siphon tube 48 extends upwardly through an opening 60 in top wall 56 and well up into an open ended standpipe 62 whose peripheral surface is integral with top wall 56.

Also upstanding from top wall 56 is rectangular standpipe 64 whose cross-sectional area is substantially greater than the cross-sectional area of standpipe 62. Standpipe 64 may be partially covered with a decorative top 66 but is fully vented to atmosphere via a large access opening 68 at the upper end thereof An end wall 70 of standpipe 64 includes an inlet fitting 72 having an outer, inlet end 74 adapted for connection to an external water supply and an inner, reduced end 76 adapted to be valved by rubber cut-off valve 78 actuated by float 80 freely movable within the confines of standpipe 64.

Desireably, the "dump" or flow rate capacity of siphon tube 48 is very large as compared with the inflow capacity flow rate of inlet fitting 72 to insure that very little incoming cold water is admitted with the outflowing hot water. Initial prototypes have employed a siphon tube having a ½" ID (which siphons the preheated water in 15 seconds) and a 1/16" ID reduced end 76 on the inlet fitting 72 which results in a three minute refill time for holding tank 12.

Figure 5:
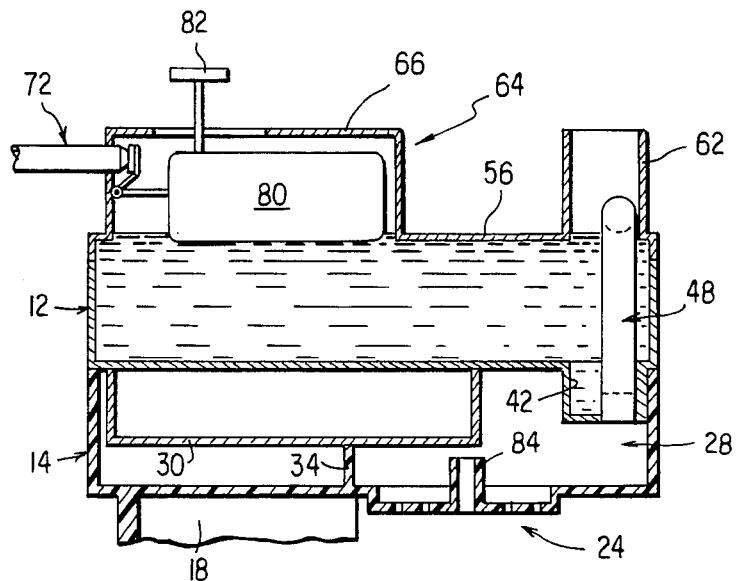
FIGS. 5–7 are diagrammatic illustrations of the cyclic operational steps in coffee brewing and preheat cycles.
Figure 6:
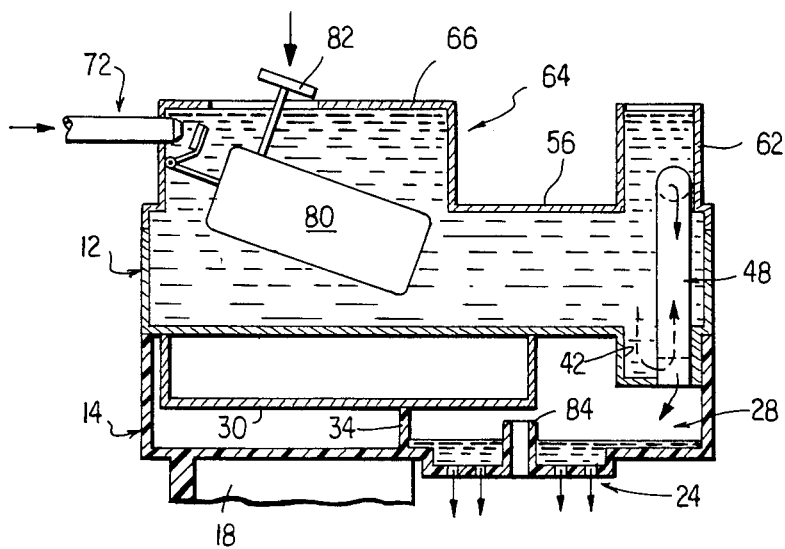
Figure 7:
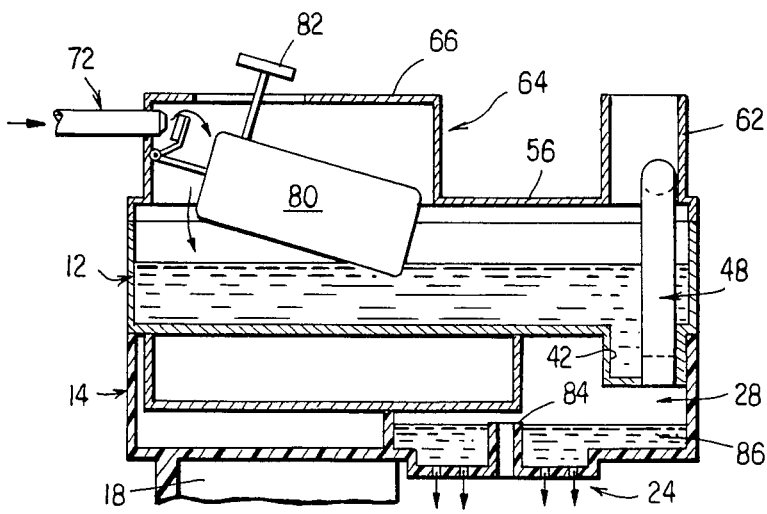

With reference to FIGS. 5-7; FIG. 5 depicts an initial "brew ready" state wherein holding tank 12 has been filled through inlet fitting 72 up to a "holding" level just below the level of bight 54 in standpipe 62 at which point inlet fitting 72 is valved off by valve 78 when float 80 rises to the position of FIG. 5. During the water inflow period, the body of water in tank 12 is heated and then thermostatically maintained at approximately 205 degrees Fahrenheit by heater 32. The coffee maker is now ready for a first brew cycle.

To make coffee, button 82 rigid with and upstanding through opening 68 from float 80 is depressed to the position of FIG. 6 which displaces water upwardly in standpipe 62 to submerge bight portion 54 of siphon 48 to commence the siphon transfer of preheated water from tank 12 to transfer tank 28 from which it passes via spray head 24 to coffee grounds in filter basket 20. An overflow standpipe 84, associated with spray head 24, limits the depth to which the water level in transfer tank 28 may rise to limit the head pressure across spray head 24. After approximately 15 seconds, the preheated water level in tank 12 has receded to the level of siphon inlet 50, siphon flow ceases and siphon tube 48 is voided, as already explained. Thereafter additional incoming water is held in tank 12 until a subsequent siphon is initiated.

FIG. 7 illustrates the condition of the coffee maker when most of the previously preheated water 86 has been metered from the transfer tank 28 and incoming water is refilling holding tank 12 until the liquid level therein again reaches the position of FIG. 5 at which time another brew cycle may be initiated by depressing button 82.

I claim:

1. In combination with a coffee maker having a filter basket in spaced, overlying relation to a coffee pot support, the improvement comprising:
    a water holding tank;
    liquid flow control means for adding water to said holding tank up to a first liquid level;
    heating means for heating water in said holding tank;
    siphon means, including a bight portion extending above said first liquid level, for selectively transferring heated water from said holding tank to said filter basket; and
    means for submerging the bight portion of said siphon to effect said transfer of heated water.

2. The combination of claim 1 wherein said means for submerging said bight portion includes float means.

3. The combination of claim 2 wherein said flow control means includes a water inlet line;
    valve means for opening and closing said line; and
    said float means actuating said valve means.

4. The combination of claim 1 wherein said siphon means includes vent means communicating with said bight portion.

5. In combination with a coffee maker having a filter basket in spaced, overlying relation to a coffee pot support, the improvement comprising:
    a water holding tank;
    said holding tank being closed except for standpipe means upstanding from a top wall thereof and a siphon tube, including a bight portion, intercommunicating the interior of said holding tank and transfer tank underlying said holding tank;
    the cross-sectional area of said standpipe means being small as compared with the cross-sectional area of said holding tank;
    the bottom of said holding tank including a well;
    the shorter, inlet end of said siphon tube disposed within said well and the longer, outlet end thereof extending through the bottom of said well;
    the bight portion of said siphon tube disposed within said standpipe means and above said top wall;
    liquid flow control means, including a float, for adding water to said holding tank up to a first liquid level below said siphon bight portion;
    said float being disposed for movement at least partially within said standpipe means;
    heating means for heating water within said holding tank;
    metering means for transferring hot water from said transfer tank to said filter basket; and
    means providing access for depression of said float so that, when said holding tank is filled to said first liquid level with hot water, and said float is depressed, hot water rises within said standpipe means and submerges the bight portion of said siphon to initiate hot water flow to said transfer tank and filter basket.

6. The combination of claim 5 including a vent tube for venting the bight portion of said siphon tube.

7. The combination of claim 6 wherein said standpipe means comprises separate standpipes for said siphon tube and float.

8. A method of making coffee, comprising:
    heating a first body of water to coffee brewing temperature in a holding tank;
    floating a buoyant member in said first body of water;
    depressing said buoyant member in said first body of water and raising the level thereof;
    transferring substantially all said body of water to basket contained coffee grounds;
    introducing cold water to said holding tank to constitute a second body of water therein;
    refloating said buoyant member in said second body of water and valving off said cold water; and
    heating said second body of water preparatory to making additional coffee.

* * * * *